(12) United States Patent
Sweeney et al.

(10) Patent No.: US 8,281,238 B2
(45) Date of Patent: Oct. 2, 2012

(54) SYSTEM, METHOD AND COMPUTER PROGRAM FOR CREATING AND MANIPULATING DATA STRUCTURES USING AN INTERACTIVE GRAPHICAL INTERFACE

(75) Inventors: Peter Joseph Sweeney, Kitchener (CA); Mark William Connolly, Waterloo (CA); Robert George Barlow-Busch, Kitchener (CA)

(73) Assignee: Primal Fusion Inc., Waterloo (CA)

( * ) Notice: Subject to any disclaimer, the term of this patent is extended or adjusted under 35 U.S.C. 154(b) by 307 days.

(21) Appl. No.: 12/615,703

(22) Filed: Nov. 10, 2009

(65) Prior Publication Data

US 2011/0113386 A1 May 12, 2011

(51) Int. Cl.
*G06F 17/00* (2006.01)
(52) U.S. Cl. .................. 715/273; 715/853; 717/140
(58) Field of Classification Search .................. None
See application file for complete search history.

(56) References Cited

U.S. PATENT DOCUMENTS

| 7,627,582 | B1 | 12/2009 | Ershov et al. | |
| 7,720,857 | B2 * | 5/2010 | Beringer et al. | 715/853 |
| 7,970,764 | B1 * | 6/2011 | Ershov | 715/853 |
| 2005/0289524 | A1 * | 12/2005 | McGinnes | 717/140 |
| 2006/0242564 | A1 | 10/2006 | Egger et al. | |
| 2008/0072145 | A1 * | 3/2008 | Blanchard et al. | 715/273 |
| 2010/0030552 | A1 | 2/2010 | Chen et al. | |

FOREIGN PATENT DOCUMENTS

WO  WO 2008076438 A1 * 6/2008

OTHER PUBLICATIONS

Y. Hassan-Montero, V. Herrero-Solana. "Improving tag-clouds as visual information retrieval interfaces" . . . .
Owen Kaser, Daniel Lemire. "Tag-Cloud Drawing: Algorithms for Cloud Visualization" . . . .
International search report and written opinion for International application No. PCT/CA2010/001772, dated Apr. 28, 2011.
International Preliminary Report on Patentability for PCT/CA2010/001772 mailed May 24, 2012.

* cited by examiner

*Primary Examiner* — Boris Pesin
*Assistant Examiner* — Ayesha Huertas Torres
(74) *Attorney, Agent, or Firm* — Wolf, Greenfield & Sacks, P.C.

(57) ABSTRACT

The present invention relates to a system, method and computer program for creating, visualizing and manipulating a data structure using an intuitive and interactive graphical interface. It is operable to display a data structure and enable users to interact with the data structure by means of a user interface. The data structure includes data entities and relationships between the data entities. One or more user context properties are associable with the data entities. The user interface is populated with data entities from the data structure by enabling the users to associate visual properties of the user interface with the user context associable properties of the data structure. This enables the users to interact with the data structure by means of the user interface.

51 Claims, 18 Drawing Sheets

OVERVIEW

OVERVIEW

INSERTING A NEW THOUGHT

INSERTING A NEW THOUGHT

INSERTING A NEW THOUGHT

RESIZING FONTS

RESIZING FONTS

RESIZING FONTS

REPOSITIONING THOUGHTS

REPOSITIONING THOUGHTS

REPOSITIONING THOUGHTS

ADDING DATA TO THOUGHTS

ADDING DATA TO THOUGHTS

SUGGESTED RELATED THOUGHTS

SUGGESTED RELATED THOUGHTS

HIERARCHY

SYSTEM, METHOD AND COMPUTER PROGRAM FOR CREATING AND MANIPULATING DATA STRUCTURES USING AN INTERACTIVE GRAPHICAL INTERFACE

FIELD OF THE INVENTION

The present invention relates generally to an interface for creating and manipulating data structures. The present invention relates more specifically to a system, method and computer program for creating, visualizing and manipulating a data structure using an intuitive and interactive graphical interface.

BACKGROUND OF THE INVENTION

Knowledge can be represented using various types of data structures, including graphs. One such graph is known as a semantic network. A semantic network is a directed graph consisting of vertices, which represent concepts, and edges, which represent semantic relations between the concepts.

A semantic network can become unwieldy as it grows.

Tags can be used to represent concepts in the semantic network. Sets of tags, in a visualization known as "tag clouds", can be used to represent relationships between concepts. Tag clouds are a familiar data visualization device on the Internet. Tag clouds are commonly used to represent tags in a meaningful way, for example to describe to a user the prevalence of tags in blogs and other Internet resources. Properties of words, such as size, weight or colour, may represent properties of the underlying data. A tag cloud may be generated either manually or using computerized means.

FIGS. 1A to 1C illustrate examples of tag clouds. As shown in FIG. 1A, for example, a cloud may comprise several differently sized tags wherein larger tags in the cloud represent a greater use of the tag in a blog. As shown in FIGS. 1B and 1C, for example, the size of the tags may signify the importance of concepts relative to a context.

Information may be encoded in tag properties (such as size, weight or colour) but absolute and relative position is virtually meaningless in a tag cloud. The tags are typically single words, which may be ordered alphabetically or otherwise. The words may be aligned on a baseline or arranged in some other way, but this is typically done to conserve space or to obtain different visual effects.

However, these tag clouds are not interactive as they merely represent information graphically without any means for feedback from a user. With a tag cloud there is no means to manipulate the relationships between the tags.

The prior art does not discuss ways in which to present a simple visual representation of a hierarchical or polyhierarchical data structure (such as a taxonomy of terms or a semantic network) so as to enable the average computer user to create, visualize or manipulate the data structure. While manual entry of new concepts and relationships has been contemplated to a limited extent in the prior art, what has not been disclosed in the prior art is the use of a tag cloud to create concepts and automatically infer relationships to existing concepts represented by the tags. What has also not been disclosed is a convenient way in which to visualize and manipulate relationships between the concepts represented by the tags. In other words, the prior art does not teach using the tag cloud as an input device to the represented semantic network or other data structure.

U.S. patent application Ser. No. 11/548,894 to Lewis et al. discloses a tag cloud that is presented to a user where each tag can lead to n-layers of relevant information.

U.S. patent application Ser. No. 11/540,628 to Hoskinson discloses a tag cloud that is computer generated in response to a search query. The tags, containing subject representation or labels, are linked to associated websites from where the information for generating the cloud is initially collected.

U.S. patent application Ser. No. 11/533,058 to Blanchard et al. discloses customizing a display of a presented tag cloud. These clouds are customizable in terms of their attributes such as font color, font size, borders, 3D-depth, shadowing, and so on. While changes in all these attributes contribute to visual display of the tags in the tag cloud, there is no corresponding material affect on the information represented by the tag cloud.

None of the above applications discuss ways in which to present a data structure to a user so as to visually represent relationships that may exist between concepts represented by the tags and enable the manipulation of the data structure by the user using the tags.

PCT/US2007/025873 to Lindermann, et al. discloses enabling a user to input, store and output in a graphical user interface concepts expressed as a word or combination of words and relationships between these concepts. The user provides the concepts to a thought engine and specifies the type or nature of relationship between concepts. A user builds and shares the generated semantic network.

Lindermann et al. is directed to enabling users that do not understand structured data to insert the data into the structure. The user inserts the data and the relationships explicitly and, therefore, must learn how the relationships are made. There is no automation provided for establishing relationships based on ways in which the user views the data. While Lindermann et al. discuss a user classifying the types of new relationships there is no discussion of simple ways in which to establish the relationship with minimal user input. There is also no discussion at all of ways in which to easily manipulate existing relationships between concepts in a semantic network.

Therefore, what is required is a means by which to enable the average computer user to create, visualize or manipulate a data structure using a tag cloud.

SUMMARY

The present invention provides a computer network implemented method for displaying a data structure and enabling one or more users to interact with the data structure by means of a user interface, the data structure including data entities and relationships between the data entities, wherein one or more user context properties are associable with the data entities, the method comprising: populating the user interface with data entities from the data structure by enabling the one or more users to associate one or more visual properties of the user interface with the user context associable properties of the data structure, thereby enabling the one or more users to interact with the data structure by means of the user interface, using one or more computer processors.

The present invention also provides a system for executing a computer-implemented method for displaying a data structure including data entities and relationships between the data entities, wherein one or more user context properties are associable with the data entities, and enabling one or more users to interact with the data structure including by creating the data structure, the system comprising one or more computer devices including or being linked to: (a) at least one display, and (b) a user interface utility operable to: (i) present to one or more users a user interface, by means of the at least one display; and (b) populate the user interface with data entities from the data structure by enabling the one or more users to associate one or more visual properties of the user interface with the user context associable properties of the data structure, thereby enabling the one or more users to interact with the data structure by means of the user interface.

The present invention further provides a computer program product containing executable computer program instructions which when executed by one or more computers having a display, presents a user interface corresponding to a data structure and enables one or more users to interact with the data structure including by creating the data structure, the data structure including data entities and relationships between the data entities, wherein one or more user context properties are associable with the data entities, the interaction with the data structure on a user interface including: populating the user interface with data entities from the data structure by enabling the one or more users to associate one or more visual properties of the user interface with the user context associable properties of the data structure, thereby enabling the one or more users to interact with the data structure by means of the user interface, using one or more computer processors.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE INVENTION

Definitions

Figure 1A:
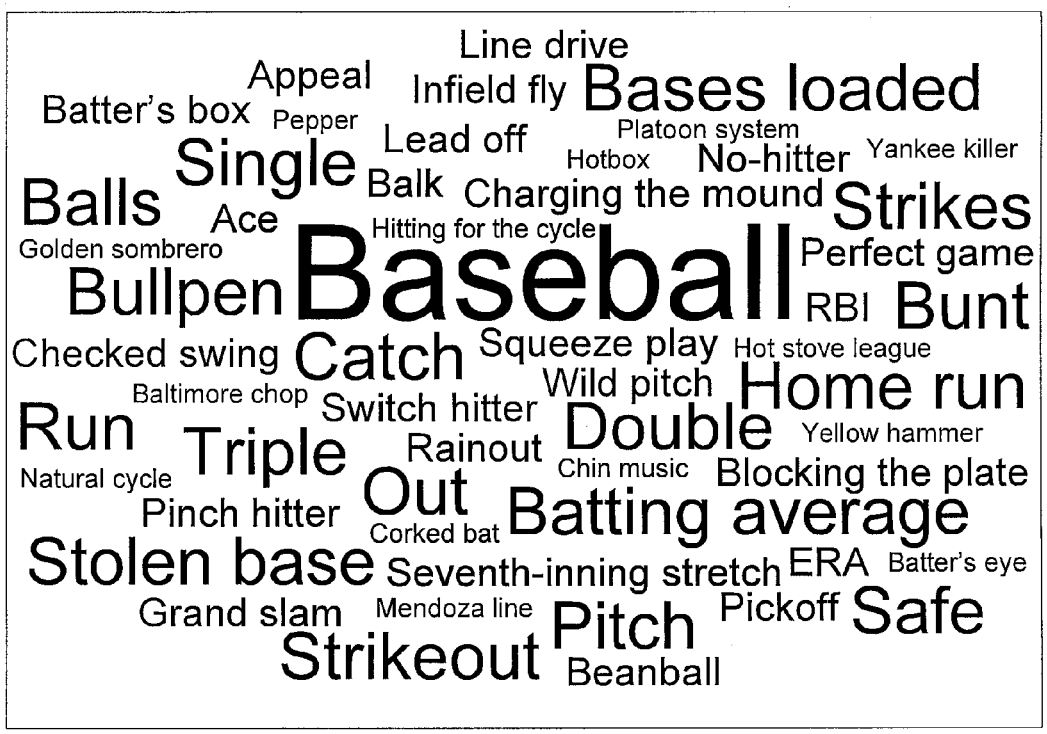
FIG. 1A illustrates a tag cloud of the prior art.
Figure 1B:
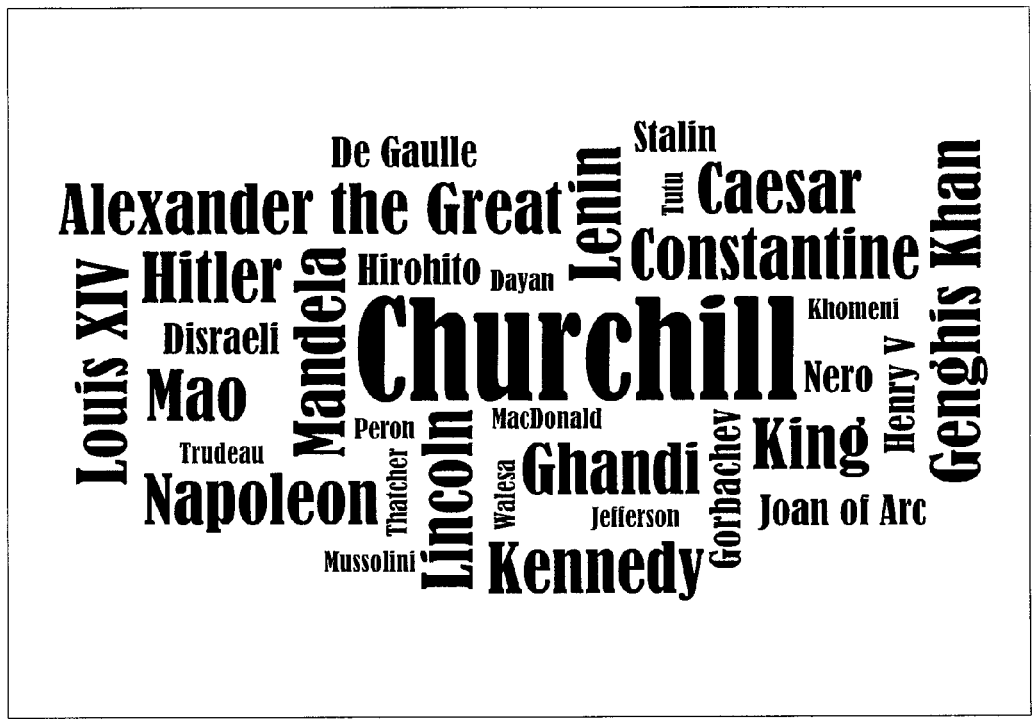
FIG. 1B illustrates another tag cloud of the prior art.
Figure 1C:
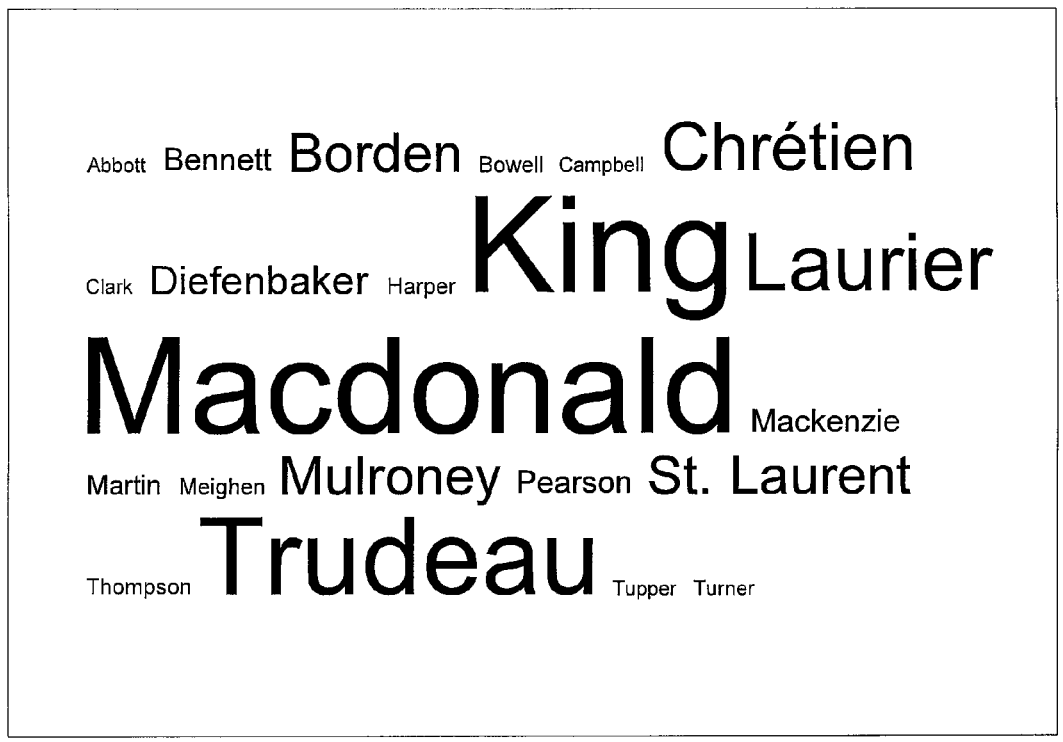
FIG. 1C illustrates another tag cloud of the prior art.

Data structure includes a means of organizing and accessing an information store comprised of knowledge representations based on relational links between data entities in the data structure.

Data entity means a knowledge representation present with a data structure.

Relationship includes hierarchical, polyhierarchical, associative, equivalence or other relationship between data entities in a data structure.

User context property means any quantitative or qualitative aspects of a concept that a user wants to portray in a data structure using the interface provided by the present invention, including for example relative topical importance, time, chronology, and/or physical attributes such as temperature, pressure, etc.

Concept, in the context of a semantic network, includes an embodiment of a data entity wherein each concept may represent a thought of a user.

Active concept means a concept under consideration.

Depth, in the generation of a semantic network, means a particular number of relationships distanced from the active concept within which to generate or display the semantic network.

Overview

The present invention provides a user interface to create, visualize and manipulate a data structure. The user interface provides an input means to the data structure. The data structure may comprise data entities and relationships between the data entities. One or more user context properties may be associable with the data entities such that, for example, the data structure may be reflective of a user context. In this regard, the user context may, but not necessarily, result in relationships between data entities being hierarchical, polyhierarchical, associative or equivalence.

The data entities are displayed by means of the user interface, enabling one or more users to interact with the data structure. The user interface enables a user to define the relationships between new and existing data entities without having to understand the nature of the relationships in the underlying data structure and without explicitly specifying the desired changes to the relationships.

The data structure may be a semantic network, wherein the data entities may be concepts. The semantic network may be provided by a semantic engine, for example as provided in PCT/CA2009/000567 to Sweeney et al. The semantic network may be variously structured, including hierarchical, polyhierarchical, cyclic, or acyclic data structures.

The user interface is designed for enabling a user to easily create, visualize and manipulate the data structure. Specifically, the data structure is represented in an easy to understand and intuitive format and enables the user to seamlessly manipulate relationships in the semantic network. The user does not have to understand the nature of the relationships in the underlying data structure or even have knowledge of the existence of relationships between any of its concepts. Rather, the relationships are defined based on the way in which the user thinks about the concepts in relation to one another.

For example, where the data structure is a semantic network, the user interface enables the creation and management of a contextual or graphical representation of the semantic network. The user interface is populated with interface components that are matched or correspond to the concepts and relationships. The interface components may, for example, be labels corresponding to representations of the concepts.

The user interface enables a layperson computer user to interact with a semantic engine for generating and refining a semantic network (which for example might include managing the relationships between concepts at one or more relationship levels in the semantic network and adding, editing or removing concepts).

The relationships are managed implicitly through the user's interaction with the user interface rather than requiring the user to explicitly define the changes to relationships in the semantic network. The labels or other interface components populated on the user interface are mapped to the relationships. The relationships are inferred from the mapping of the concepts on the user interface as managed by the user, which may reflect the way in which the user thinks about the concepts in relation to one another. The user can also create, edit or delete concepts from the semantic network by manipulating the interface components. By managing this contextual or graphical representation of the semantic network, the user is actually causing the invention to automatically create or manipulate the relationships of the semantic network.

The representation may include a plurality of dimensions in visual space for mapping one or more various properties or attributes relating to the data entities. The one or more properties may, for example, be visual properties including position, size, colour, distance, typeface, underlining, outlining, weight, gradient, time, and any other visually meaningful attribute.

The user interface may be understood as a thought cloud, that is, a cloud of tags in which a user's thoughts are manifested. The thought cloud is operable to display to a user a plurality of labels that reflect concepts that are related in the underlying semantic network, and are arranged as labels in the thought cloud based on their relationships. In this way, various user context properties of the underlying data structure and the relationships between entities in the data structure may be represented in the visualization.

A user may interact with the user interface to further create, visualize and manipulate the semantic network, for example to manage the semantic network in such a way that it reflects the way in which the user thinks about the concepts in relation to one another. The user may be provided with tools by the user interface including adding concepts to the semantic network and manipulating the relationships in the semantic network. In this way, a user is not burdened with managing, or even having an understanding of, the complexities of the corresponding data transformation formalisms that are being processed in accordance with the user's interactions with the semantic network. There is no requirement that the user interface explicitly display to the user the relationships among the concepts comprising the semantic network, however it may.

The present invention also comprises a user interface for a semantic network in which users are provided with a plurality of suggested labels representing concepts in the semantic network that are potentially related to one or more labels input by the user to the user interface. The semantic network may comprise concepts and relationships between concepts. The user can optionally approve the suggested labels, whose mapping implicitly results in inferred relationships to other concepts in the semantic network, enabling the creation of new relationships from the existing concepts to the concept represented by the suggested label.

In the description that follows, a semantic network is used as an example data structure, and a thought cloud is used as an example user interface for the semantic network. However, it should be understood that the data structure could be any data structure comprising data entities and relationships between the data entities, wherein user context properties are associable with the data entities. Furthermore, it should be understood that the term "thought cloud" is used for convenience only.

Thought Cloud

The present invention comprises a user interface to create, visualize and manipulate a data structure that may, for example, be a semantic network comprising concepts and hierarchical or polyhierarchical relationships between the concepts. The semantic network, for example, may be provided by a semantic engine, for example as provided in PCT/CA2009/000567 to Sweeney et al., and may be initiated from an active concept. The user interface provides an input means to the semantic network that enables a user to manipulate relationships between new and existing concepts without having to understand the nature of the relationships in the underlying semantic network and without explicitly specifying the desired changes to the relationships.

The user interface enables the creation of a contextual or graphical representation of the semantic network. The user interface may be a thought cloud. The thought cloud displays to a user one or more interface components, that may for example be labels, corresponding to concepts that are hierarchically or polyhierarchically related in the underlying semantic network. The labels may have one or more properties wherein each property can be contextually or graphically represented. These properties enable each of the concepts to be represented by the user interface in an organized manner. This enables the user interface to represent the relationships without explicitly displaying the relationships to the user, so as to prevent confusion of users that do not have an understanding of the nature of existence of the relationships.

Whereas tag clouds are not interactive, a thought cloud is. Although tag clouds have been used as output devices, a thought cloud can also be used as an input device for enabling a user to create, visualize and manipulate the semantic network. The user may be provided with tools by the user interface including adding concepts to or modifying concepts in the semantic network and means by which to manipulate the hierarchical or polyhierarchical relationships in the semantic network without requiring the user to know it is doing so. In this way, a user is not burdened with managing, or even having knowledge of, the complexities of the corresponding data transformation formalisms that are being processed in accordance with the user's interactions with the semantic network.

A user of the thought cloud can, for example, move the labels relative to each other and change properties of the labels, which results in changes to the underlying semantic network without the user being exposed to the associated transformations. Thus a thought cloud enables a user to capture its thinking on a computer by creating, arranging and manipulating labels representing concepts in whatever way makes sense to the user. For example, there is no need for any particular alignment or arrangement of labels in a thought cloud, as the labels can be arranged and rearranged as the user desires.

Example Workflow

A user may use the present invention to create, visualize and manipulate a data structure that may, for example, be a semantic network. For example, the following workflow is one particular example usage of the present invention. However, it should be understood that other uses are possible, for example where the data structure is a data structure other than a semantic network, or where the semantic network is fully generated by the user rather than a semantic engine.

The user may initially access the user interface and be provided by the user interface with means for inputting an active concept and optionally a depth. The user may input the active concept, which is obtained by a semantic engine. The semantic engine, in accordance with its implementation, generates a semantic network. The user interface displays to the user a thought cloud representing the semantic network. The thought cloud is optionally constrained to those concepts within the depth of the active concept, if the depth was specified by the user. It should be understood that the semantic engine may use the depth to limit the generation of the semantic network from the active concept.

The user then can visualize the semantic network by the thought cloud. The user may navigate the thought cloud, for example by panning across the thought cloud or zooming in and out of the thought cloud. The user may manipulate the labels representing the concepts as displayed in the thought cloud. For example, the user may move one or more of the concepts on the user interface, or may manipulate one or more properties of one or more concepts. Each manipulation is processed by the invention, which automatically alters the semantic network to reflect the user's manipulations of the concepts in accordance with translation rules.

The user can also add or delete concepts in the thought cloud. When adding a concept, the user may define properties for the concept. The concept and its properties can be processed by the invention, which automatically alters the semantic network to reflect the addition of the concept based on its particular properties in accordance with translation rules.

The user interface can provide the user with a means by which to save the semantic network it has created and manipulated. The user may save a plurality of its created and manipulated semantic networks, for example representing the semantic network at different historical points or dates. The user interface can also provide the user with a means to restore any of the saved semantic networks.

Visualizing a Thought Cloud

The user interface may be a screen or a part of a screen that serves as boundaries for visualizing a thought cloud.

A user interaction may be used for determining a starting point for building a thought cloud initially, in order to prevent an unwieldy number of concepts appearing in the thought cloud. For example, a semantic engine for generating a semantic network may be provided for receiving a user interaction information (a context) from which an active concept may be derived. The semantic engine may be, for example, that described in PCT/CA2009/000567. The active concept could be considered the starting point for visualizing the semantic network. A depth may be provided so that only those concepts in the semantic network that are related to the active concept within the depth are displayed by the user interface.

Alternatively, to deal with space constraints, the user interface could include the ability to vary resolution, mimicking motion in the z-direction by zooming in and out. The user interface may also provide the ability for panning vertically and horizontally to navigate through different areas of a thought cloud. When panning, a concept that happens to fall near a particular area of the user interface, for example in the centre, can be used as an active concept to further display the semantic network.

The concepts and relationships between concepts can be represented by one or more properties or attributes, including for example visual properties, in accordance with a set of translation rules. These properties may include x, y and z coordinates; size; colour; distance; typeface; underlining; outlining; weight; gradient and any other visually meaningful attribute. Each of the properties is associable with a user context property of the underlying data structure (such as the meaning of a concept or the type of relationship defined by the translation rules, including, for example, order, confidence, time or prevalence). These extensible properties enable the invention to work with any range of complex concepts and complex relationship types (including hierarchical, associative, or equivalence relationships). There may be any number of translation rules provided for associating properties of the underlying data structure with the properties of the visualization and interactions.

Figure 2:
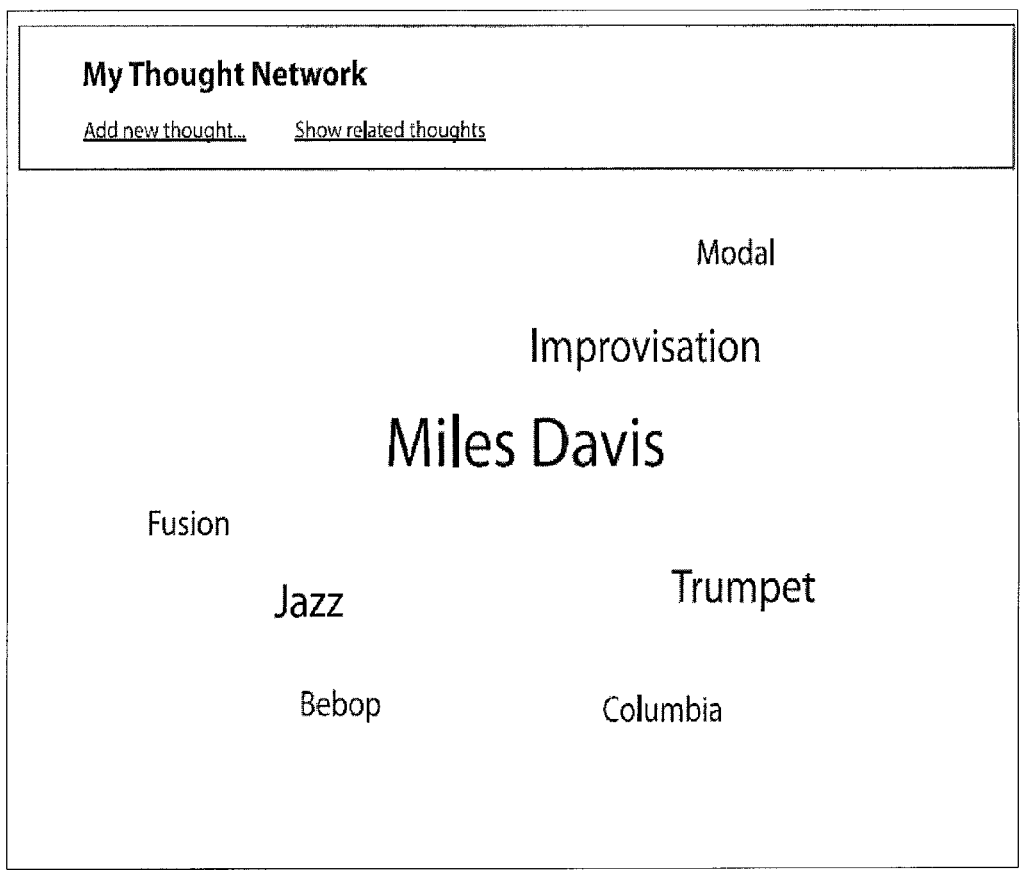
FIG. 2 illustrates a thought cloud of the present invention.

FIG. 2 illustrates a thought cloud in one particular example. An importance or depth in the semantic network (from the active node or concept) could be represented in a thought cloud as size of a label, parent-child relationships could be represented by relative position between concepts where the closest larger concept is the parent, the order of sibling concepts could be represented by a distance from a common original or the distance to a parent concept, and the source of the concept (for example, the user providing the concept) could be represented by colour. It should be understood that the specific visual properties used to represent the relationships between concepts in the thought cloud can vary.

Figure 8:
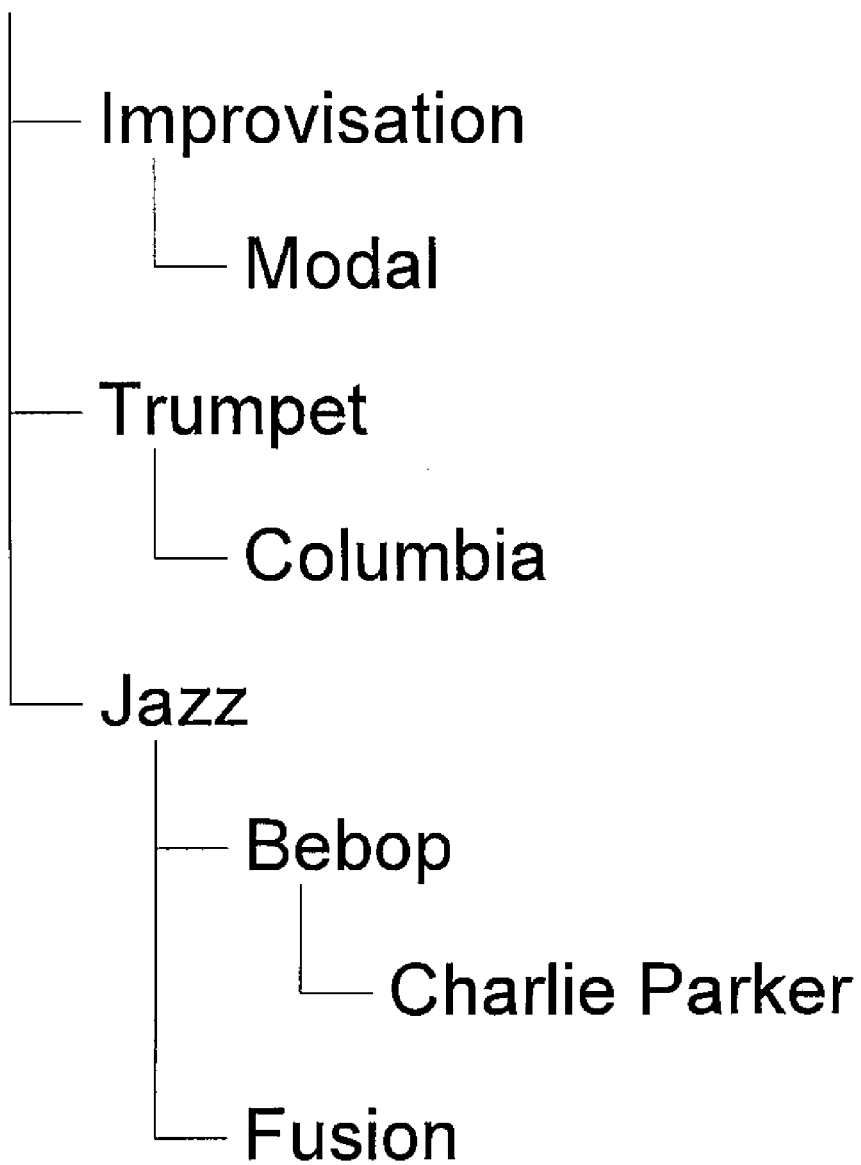
FIG. 8 illustrates an example of a hierarchical semantic network operable with which the present invention is operable.

For example, consider the semantic network comprising the hierarchy shown in FIG. 8. In this example, concepts with the largest text size are at the root level of the semantic network while concepts with the smallest text size are at the leaf level. For any other concepts, the nearest larger concept is its parent (for example, a concept in font size 8 has a parent that is the nearest concept whose size is greater than 8).

As shown in FIG. 2, for example, the active concept 'Miles Davis' is the parent concept for 'Improvisation', 'Trumpet' and 'Jazz', as it is the nearest larger concept for each of these child concept. Similarly, both 'Fusion' and 'Bebop' have 'Jazz' as a parent, 'Columbia' has 'Trumpet' as a parent and 'Modal' has 'Improvisation' as a parent. Additionally, it can be seen that 'Bebop' is more closely related to 'Jazz' than to 'Modal'.

The depth of relationships to be displayed by the user interface could be constrained by a depth, as previously mentioned.

Thus, the user interface as provided can be used for visualizing a hierarchical or polyhierarchical semantic network. In a strict hierarchy, each concept can have one and only one parent (except for the root concept, which has no parent), while in a polyhierarchy, each concept can have multiple parents. For example, a polyhierarchy can be visualized by placing a child concept equidistant from multiple same sized parent concepts.

Optionally, as it could be difficult to arrange concepts so that they are truly equidistant or of the same size, these or other properties could be divided into configurable units and ranges. For example, within a unit or range the actual property value may vary but the semantic network may treat them as the same. Alternatively, distances and text sizes could be made to 'snap' to the nearest value on a configurable grid, where the grid would allow for a simpler placement of concepts.

Adding Concepts

The present invention comprises means for using the thought cloud as a means for the user creating concepts in the semantic network, and for automatically generating corresponding relationships in the semantic network. Once the thought cloud has been visualized by a user, the user can add concepts to the thought cloud, which then are reflected as new concepts in the semantic network. The new concepts will have the relationships in the semantic network based on the user's configuration of the properties of the label representing the concept. Again, the user does not have to understand that the properties are reflective of the relationships of the concept to other concepts in the semantic network.

Figure 3A:
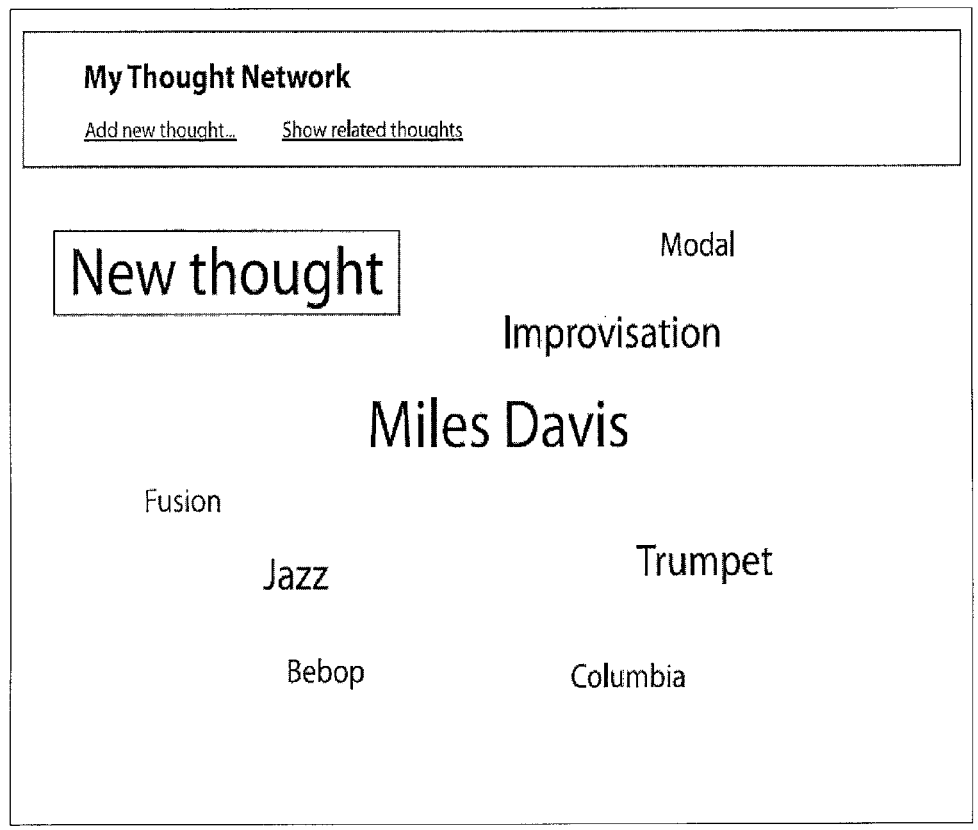
FIG. 3A illustrates inserting a new concept to the thought cloud.

FIG. 3 illustrates the addition of a new concept. A user could select a command for adding a new concept, which results in a new concept field being displayed in the user interface. FIG. 3A shows a label for a new concept added to the user interface. The label may be clearly marked as new for enabling the user to easily determine that it is a new and configurable label.

Figure 3B:
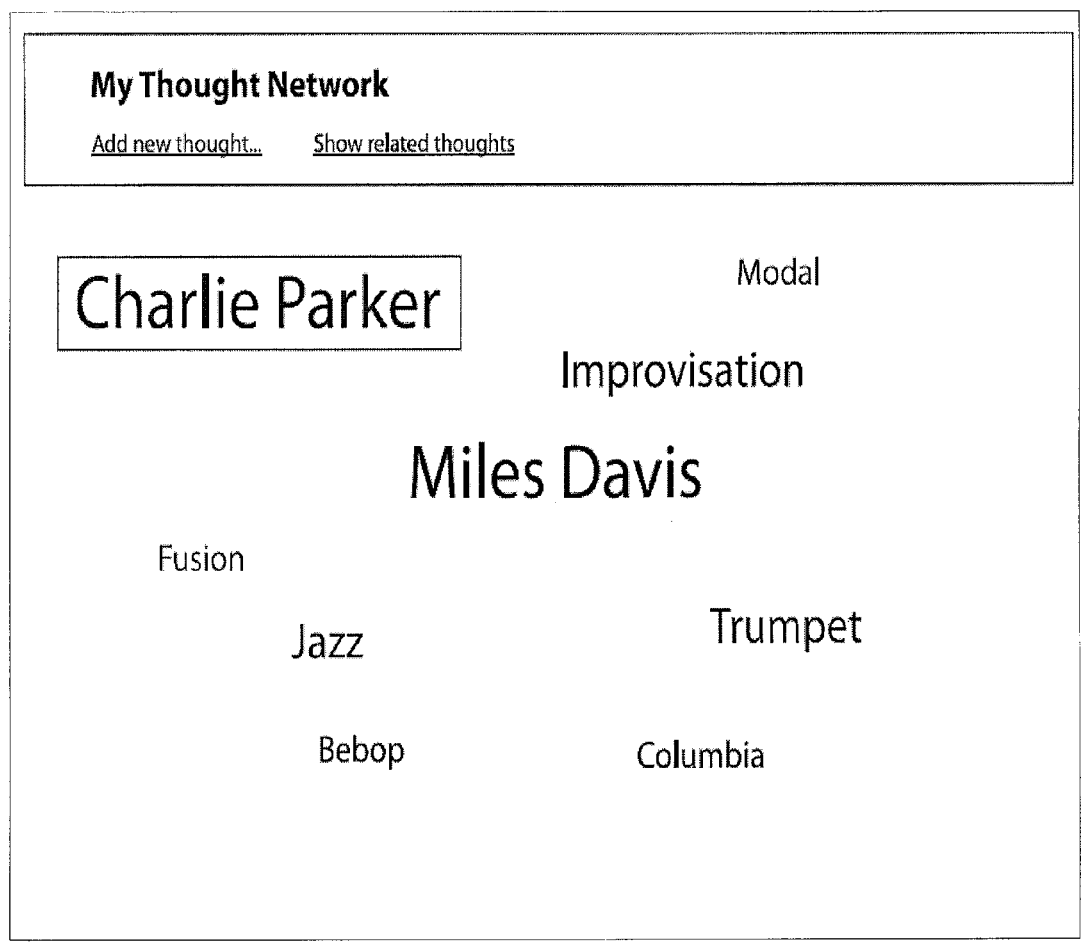
FIG. 3B illustrates changing a label corresponding to a new concept of the thought cloud.
Figure 3C:
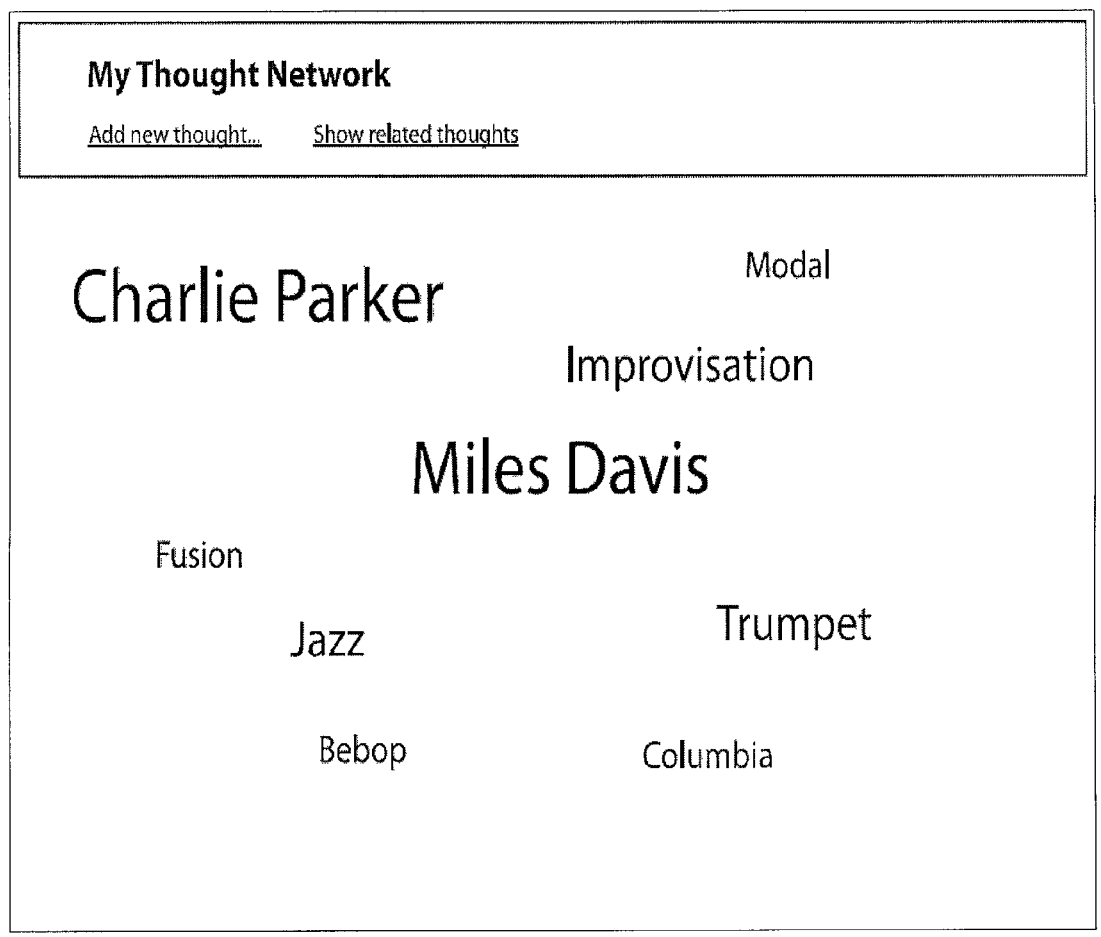
FIG. 3C illustrates a changed label corresponding to a new concept of the thought cloud.

The user could create a meaningful label for the new concept, as shown in FIG. 3B. Once the user enters a label, the label can become part of the thought cloud, as shown in FIG. 3C. Once added, one or more of the new concept's properties in the underlying semantic network are automatically generated based on the label's properties in the thought cloud, as previously described. A user can further manipulate the generated properties or create the properties for a label.

Manipulating or Deleting Concepts

The present invention also comprises a user interface to enable a user to manipulate concepts in a thought cloud, resulting in automatic management of the concept and its relationships in a semantic network.

Figure 4A:
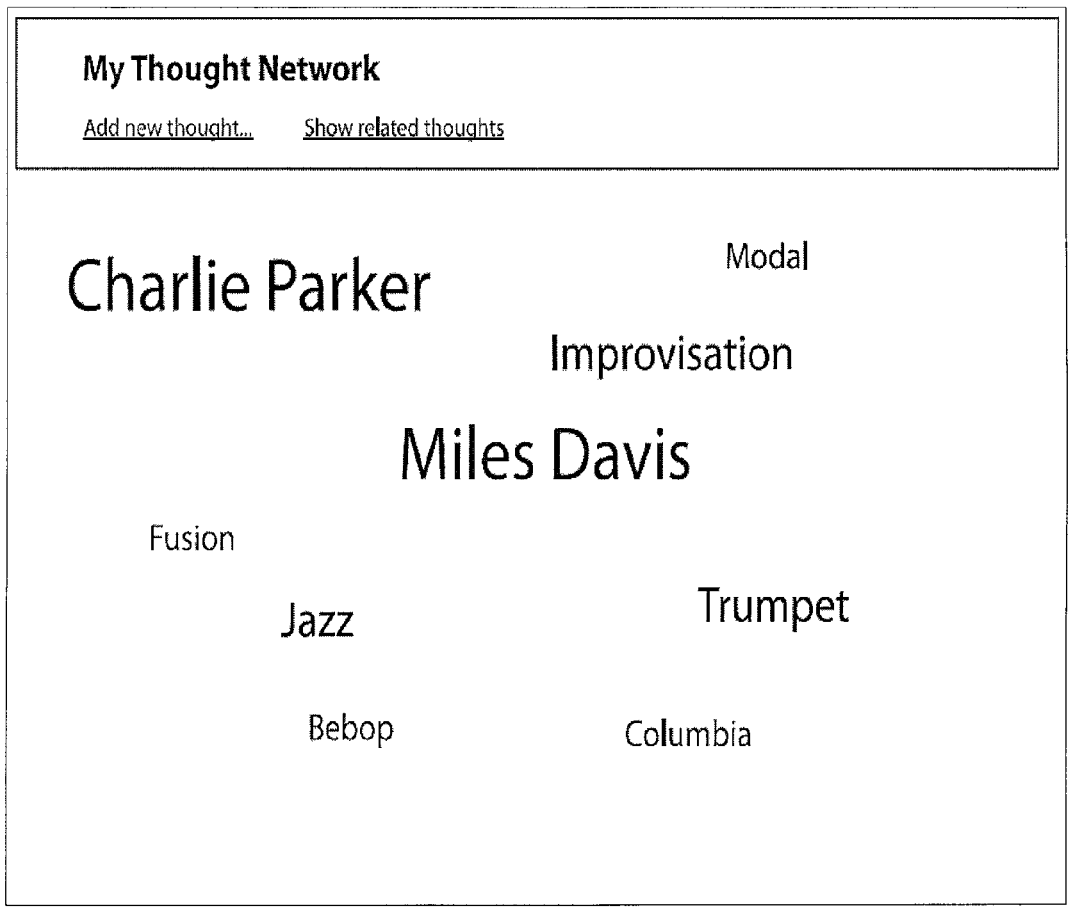
FIG. 4A illustrates a label corresponding to an existing concept of the thought cloud.
Figure 4B:
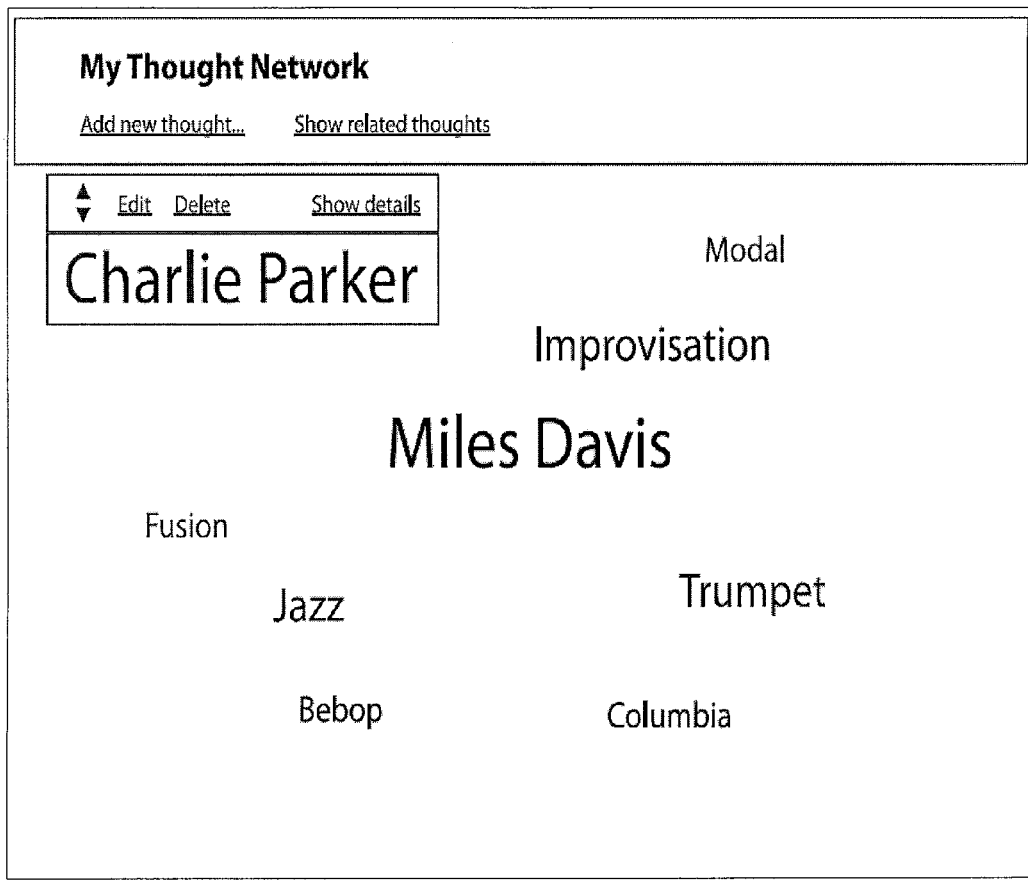
FIG. 4B illustrates a means for resizing the label's font in the thought cloud.

For example, properties or position of a new or existing label could be changed by the user. FIG. 4A shows a thought cloud. The user could select the concept to be manipulated by, for example, hovering a mouse pointer over the label corresponding to the concept or clicking the label. FIG. 4B shows a selected label. Once selected, a means for configuring the property, which may for example be a drop down list or a text box listing all possible configurations of the property, can be provided in proximity of the label to be configured. Options including means for configuring each property could be given to the user. The user could also be presented with options for deleting the label altogether, which would remove the concept from the semantic network.

Figure 4C:
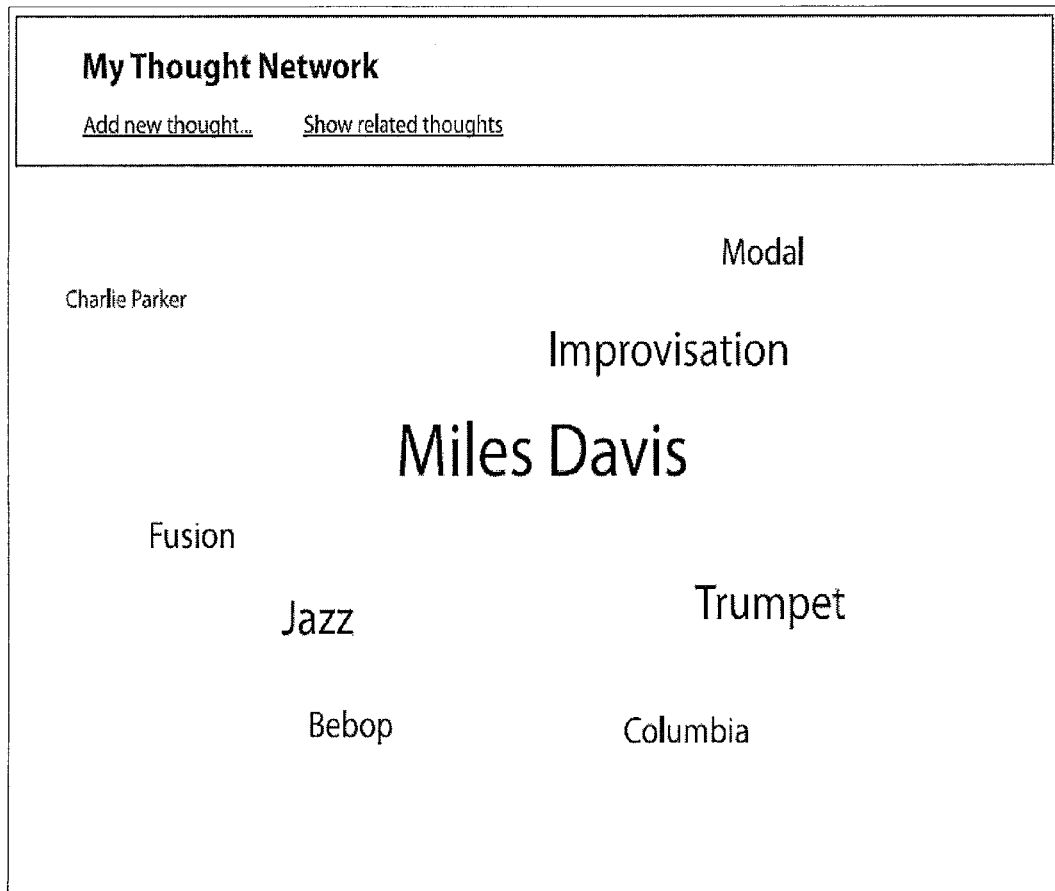
FIG. 4C illustrates a resized font of the label.

For example, the user could configure the font size of a label. The user interface could provide up and down arrows to increase and decrease the font size, respectively. The user could, for example select a down arrow to reduce the font size of the label and, once the user is satisfied with the changes to the properties, deselect the label to apply the configuration as shown in FIG. 4C.

Figure 5A:
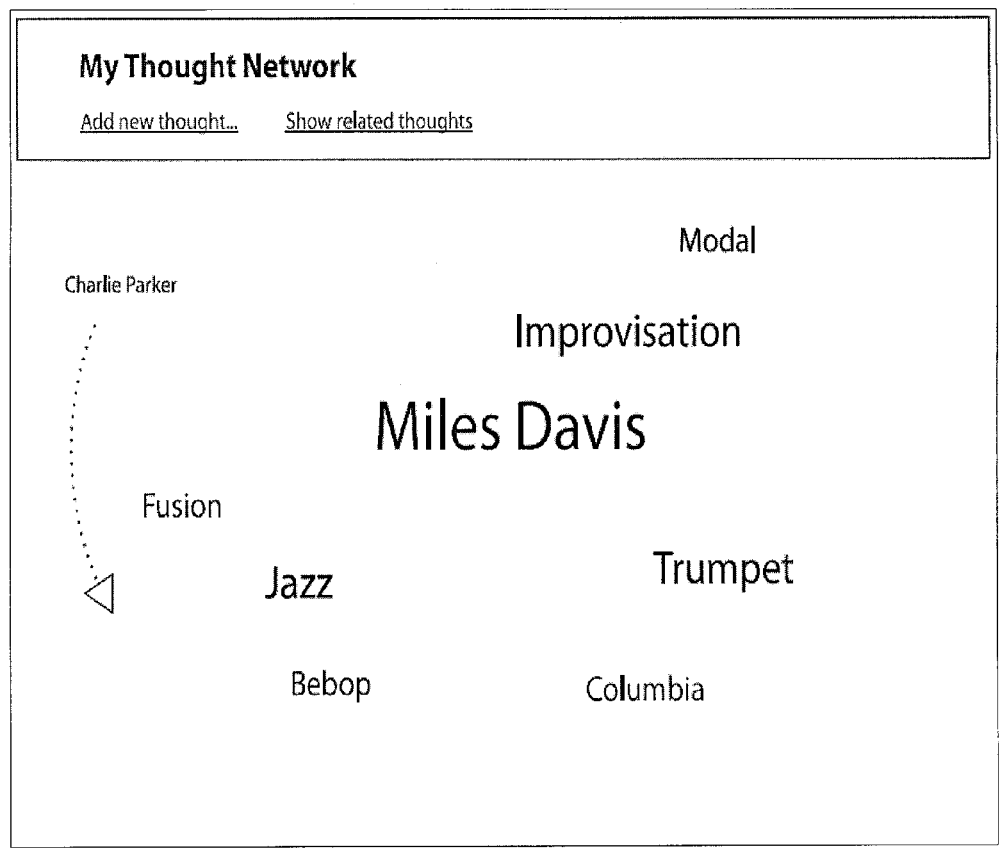
FIG. 5A illustrates a label of the thought cloud to be repositioned.
Figure 5B:
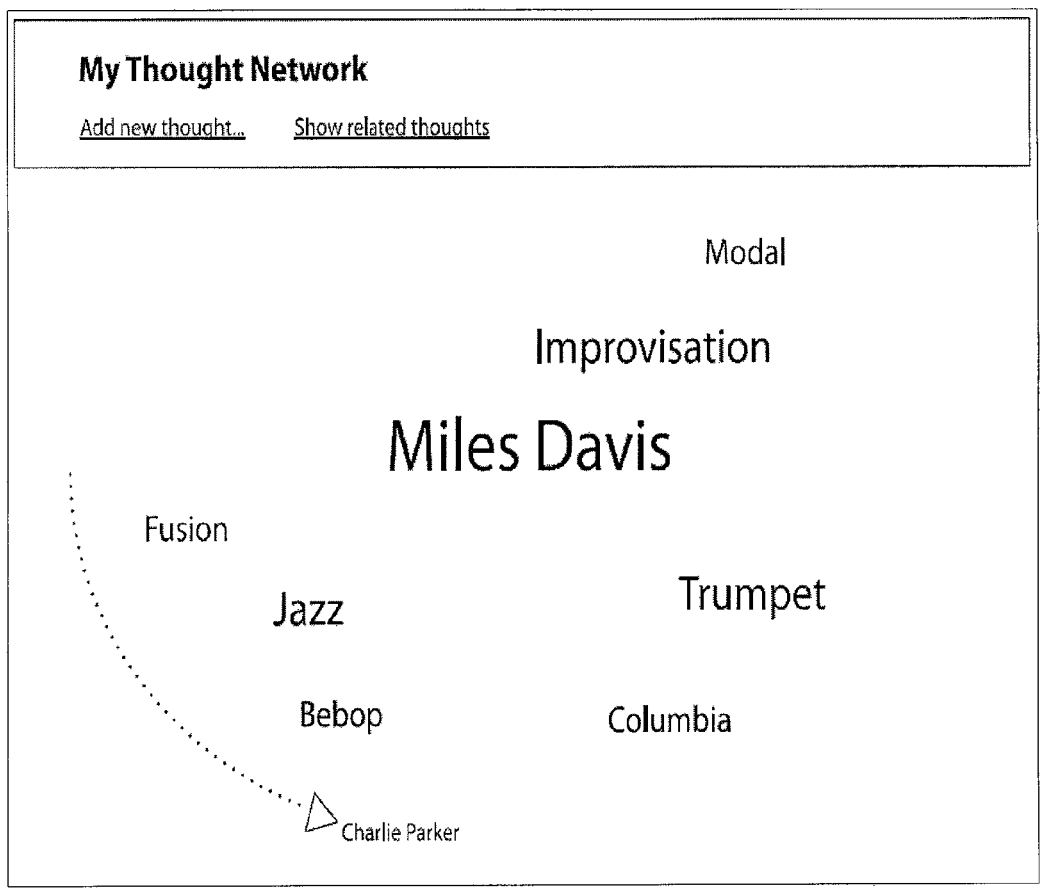
FIG. 5B illustrates repositioning the label.
Figure 5C:
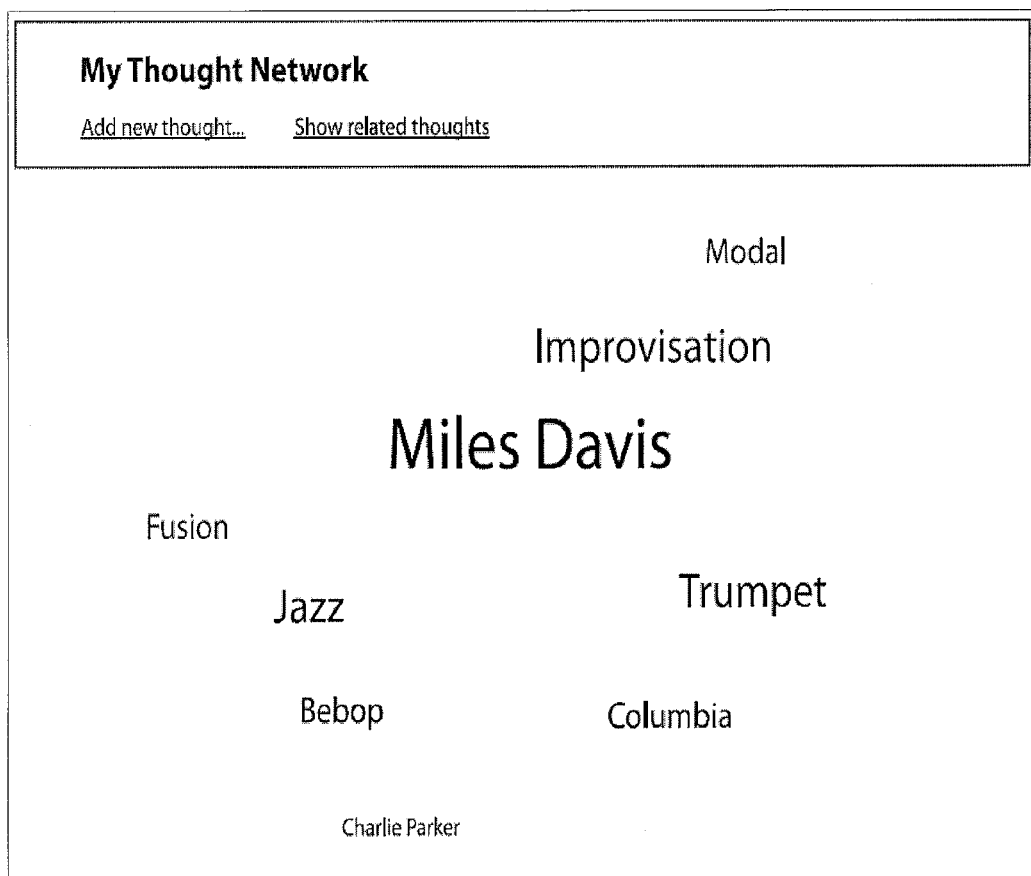
FIG. 5C illustrates a repositioned label.

Labels could also be repositioned to alter the relationships between concepts of the semantic network. FIG. 5A illustrates a label corresponding to a concept that a user desires to move. The user could select and move the label, for example by clicking the label and dragging it to a desired location as shown in FIG. 5B. The user could deselect the label to apply the configuration of the concept as shown in FIG. 5C.

The user's manipulation of the properties of labels can be processed by automatically altering the relationships between concepts in the underlying semantic network in accordance with the translation rules.

Similarly, concepts could also be removed from the semantic network. For example, the user may select a deletion command to remove the concept. Concepts related to the active concept of the semantic network only through the removed concept could optionally also be removed, however concepts having polyhierarchical links to the active concept of the semantic network may only have links through the removed concept severed while other links not through the removed concept may remain intact.

Similar processes could be provided for configuring any of the properties of the labels including, for example, geometric attributes including colour, weight, gradient, etc.

Once the configuration has been applied, the user's manipulation of the properties can be processed by automatically manipulating the concepts and relationships between the concepts of the semantic network in accordance with the translation rules.

In certain data structures, particularly those that are not polyhierarchical data structures, there may be a need for resolving ties caused by ambiguous manipulations of new or existing labels. However, resolving ties can also be used with polyhierarchical data structures, for example to limit the number of polyhierarchical relationships.

For example, in a semantic network, a concept placed equidistant between two potential parent concepts could cause a tie. The potential for ties increases as the underlying semantic network is developed. A set of tiebreaking rules could, therefore, be provided for resolving ties. For example, when using the earlier set of sample translation rules, the system may need to break ties when determining parent-child relationships. If a concept has multiple larger concepts that are the same shortest distance from it, these criteria could determine which one is the parent. An example set of tiebreaking rules for this purpose could include, in order: (1) the larger concept is the parent; (2) rank on some other established property of the concepts, such as the time of the most recent change, the confidence of the relationship, the distance from a common origin or the alphabetical order (the property chosen for this ranking can be anything that makes sense for the particular thought cloud); (3) the number of generated or user-defined properties for the label corresponding to the concept; (4) if polyhierarchies are not allowed, then make a random selection; (5) prompt the user to select the parent; (6) if polyhierarchies are allowed and the tie is not broken by the first or second of the above criteria, then all the candidate concepts may be deemed to be parents of the child concept.

Continuing with the same example, the system may also need to break ties when determining sibling order. If two or more concepts are the same distance from the common origin (or from their parent concept, if using it instead of an origin), these criteria could determine which sibling has precedence: (1) The larger concept is the earlier sibling; (2) rank on some other established property of the concepts, such as the time of the most recent change, the confidence of the relationship, the distance from a common origin or the alphabetical order (the property chosen for this ranking can be anything that makes sense for the particular thought cloud); (3) make a random selection or prompt the user for the sibling order.

Creation and Manipulation

Additionally, concepts of a semantic network can be manipulated by adding detail to the concepts. For example, while the primary representation of a concept is its label, the concept may also comprise content, normally hidden from view, such as tags, notes, graphics, links to audio or video, or other content.

Figure 6A:
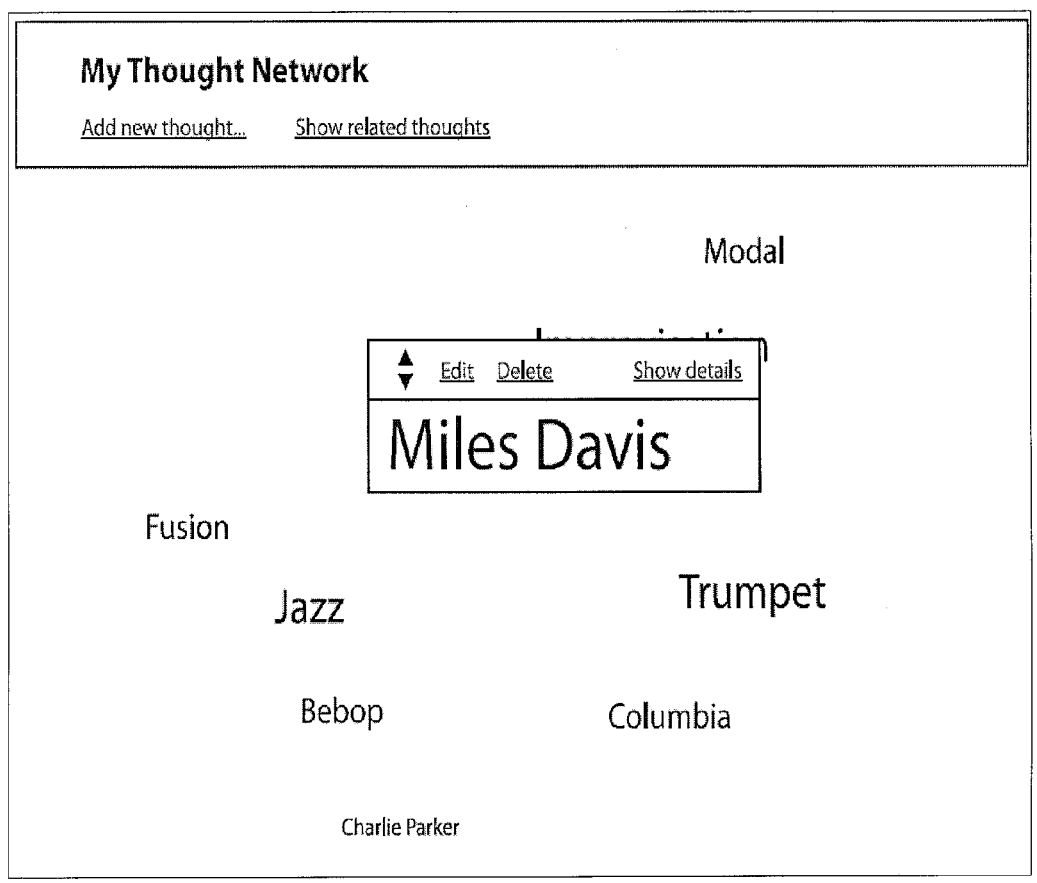
FIG. 6A illustrates a means for changing content related to a concept.

For example, a user could select a label for a concept of the semantic network which may result in a means for viewing content, which may for example be presented by a drop down menu or a text box displaying the content or a portion thereof, related to the concept, as shown in FIG. 6A.

Figure 6B:
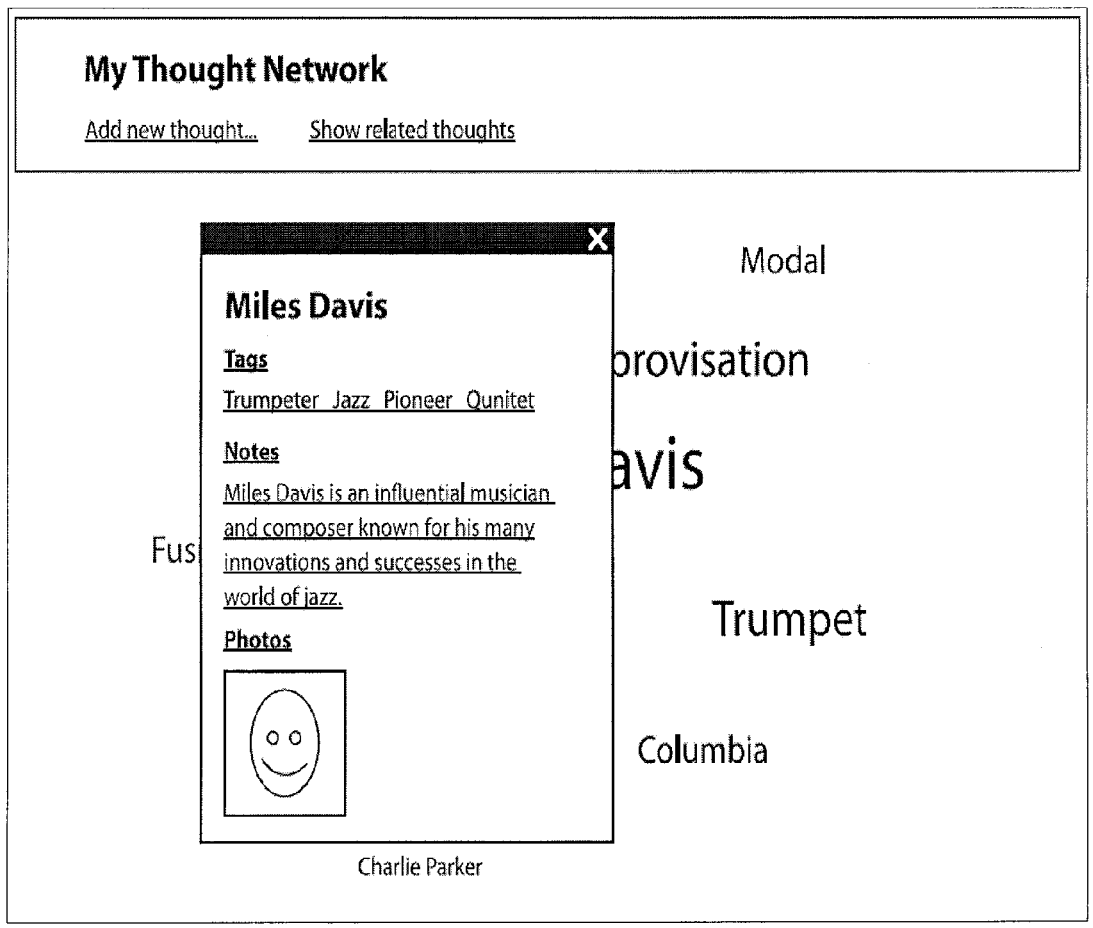
FIG. 6B illustrates content related to a concept.

The user could select to view the content, which results in the content being displayed, as shown in FIG. 6B. The content could be displayed in an editable format, enabling the user to manipulate the content. Once the label is deselected, the content may again be hidden and the content could be applied back to the semantic network. The user could also access the means for viewing content for the purpose of creating content corresponding to the label.

Augmentation

The user interface may also provide users with a plurality of suggested labels representing concepts that are potentially related to one or more labels input by the user to the user interface and/or labels displayed to the user on the user interface. The user may select one or more of these inputted and/or displayed labels, whether directly or indirectly related in the underlying data structure, to be presented with suggested labels from the semantic engine.

Suggested labels may change based on the one or more properties of the one or more labels input by the user, for example based on a label's position or size. The suggested labels may changed based on changes to the one or more properties, and may changed due to addition, deletion or modification to other labels.

The user can optionally approve the suggested labels, enabling the automatic generation of new relationships from the existing concepts to the concept represented by the suggested label. Again a semantic network will be used as an example data structure however the following could apply to any other data structure.

Concepts related to those represented in the thought cloud may be suggested by an associated semantic engine, such as that described in PCT/CA2009/000567. These concepts can be from another semantic network (created by the user or someone/something else), from a domain of information, or from a combination thereof. The user can set a minimum and/or a maximum value of some criterion (for example, density or confidence) for the inclusion of concepts in the suggested set. If a minimum and maximum are set the user can create a window for inclusion rather than a simple hurdle.

Related concepts can optionally be distinguished from the user's own concept by using a distinguishing means, for example colour, shade, opacity, gradient, or a geometric attribute.

Figure 7A:
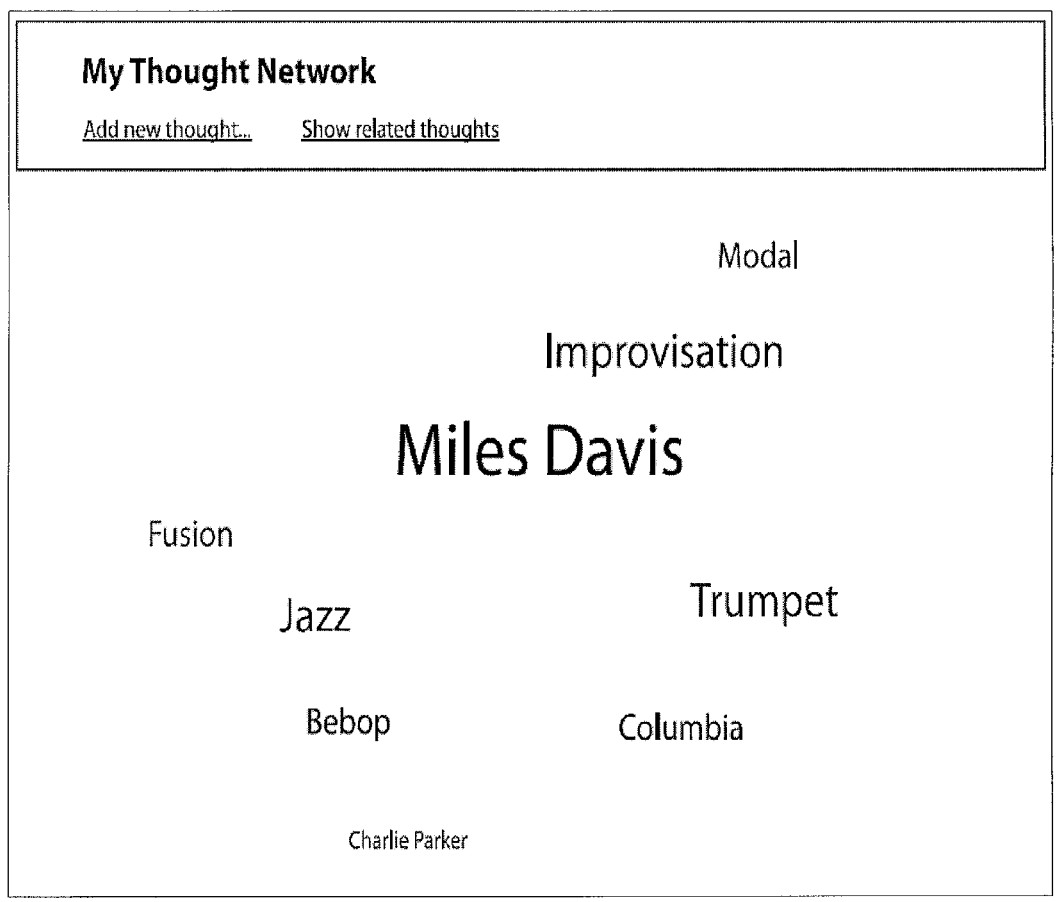
FIG. 7A illustrates a thought cloud.
Figure 7B:
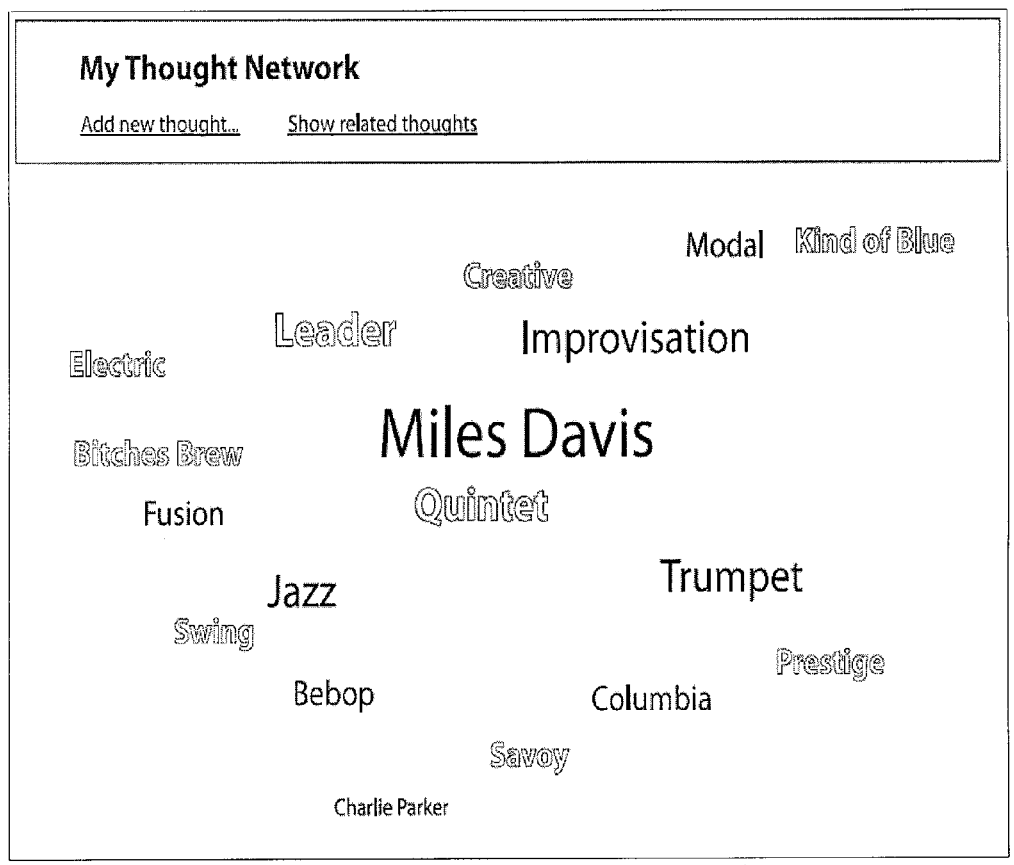
FIG. 7B illustrates suggested concepts shown in the thought cloud.

Consider, for example, the thought cloud of FIG. 7A. Labels for related concepts could be presented in a panel of the user interface that is separate from the one containing the user's original thought cloud. Alternatively, as shown in FIG. 7B, labels for the user's concepts can be displayed using different font attributes than labels for the suggested concepts.

Additional Implementations

Instead of the proximity of labels representing the closeness of relation between concepts and size representing a concept's level in a semantic network, one could augment this approach by representing different levels of confidence in each concept with a gradient of dark to light text for their labels. If a concept suggested by the semantic networking system has a confidence of 0.1, its label could be shown in lighter text. If the user selects the concept, its confidence could change to 1.0, and its label would become dark.

Further extensions of a user interface of the present invention for creating, visualizing and manipulating data structures can be provided beyond thought clouds for semantic networking.

A different example could have a goal-planning application translate x-coordinate as date, y as projected cost and z (size) as importance. The user interface could include explicit axes for these physical dimensions to help the user interpret their meaning. Here, the date dimension could employ a text gradient in parallel with x-coordinate, with older goals having lighter labels.

The representation of time with a text gradient could also be applied to these examples. This way, the gradient would represent time instead of confidence.

The invention claimed is:

1. A computer network implemented method for displaying a data structure and enabling one or more users to interact with the data structure by means of a user interface, the data structure including data entities and relationships between the data entities, wherein one or more user context properties are associable with the data entities, the method comprising:
   populating the user interface with data entities from the data structure by enabling the one or more users to associate one or more visual properties of the user interface with the user context associable properties of the data structure, thereby enabling the one or more users to interact with the data structure by means of the user interface, using one or more computer processors;
   wherein the relationships are hierarchical or polyhierarchical;
   wherein in the user interface, one larger data entity having a higher number of visual properties determines a higher level of hierarchy and thereby dissolves the poly-hierarchical relationship.

2. The method of claim 1, wherein the one or more users modify the visual properties to interact with the data structure.

3. The method of claim 2, wherein the data structure is modified to provide a modified data structure that reflects the visual properties displayed on the user interface as a result of the user interaction.

4. The method of claim 3, wherein the modified data structure is stored, and wherein the method comprises the further step of restoring the modified data structure as of a particular historical point in time.

5. The method of claim 1, wherein the visual properties of the user interface are associated with interface components corresponding to the data entities, and further comprising enabling the one or more users to add or delete one or more interface components using the user interface, and to define visual properties for the one or more interface components, resulting in modifying the data structure to reflect the interface components.

6. The method of claim 5, wherein the interface components are contextual or graphical labels.

7. The method of claim 1, wherein the visual properties include size, and wherein the nearest larger sized data entity to another particular data entity represents a hierarchical relationship between the data entities.

8. The method of claim 2, wherein the visual properties are selected from a group consisting of: position, size, colour, distance, typeface, underlining, outlining, weigh, gradient; time; and any combination thereof.

9. The method of claim 1, wherein the data structure is a semantic network such that the data entities include concepts and the relationships include semantic relationships between the concepts.

10. The method of claim 1, wherein the user interface is operable to suggest a set of one or more additional data entities that are related to one or more of the data entities displayed by the user interface.

11. The method of claim 10, wherein the one or more users select the one or more data entities displayed by the user interface to initiate the user interface suggesting the one or more additional data entities.

12. The method of claim 10, further comprising enabling the one or more users to modify the visual properties to interact with the data structure, wherein the user interface is operable to suggest a second set of one or more additional data entities that are related to the data entities displayed by the modified user interface.

13. The method of claim 2, wherein the visual properties can be accessed and manipulated by the one or more users by means of the user interface.

14. The method of claim 1, wherein the one or more users can create one or more visual properties that are not already generated.

15. The method of claim 1, wherein for one or more data entities, the one or more users can add or manipulate content selected from a group consisting of tags, notes, graphics, links to audio, links to video, or any combination thereof.

16. The method of claim 7, wherein a polyhierarchical relationship is represented on the user interface by a data entity that has at least two equidistant and equally larger sized data entities.

17. The method of claim 16, further comprising implementing one or more rules to address the polyhierarchical relationship based on: one or more visual properties of the data entities involved in the relationship; a number of generated or user-defined visual properties corresponding to the data entities in the relationship; a confidence of the relationship; random selection; user selection; allowing the tie; or any combination thereof.

18. The method of claim 1, wherein the one or more users can navigate the data entities and relationships by panning across and/or zooming in and out of the user interface.

19. The method of claim 7, wherein the hierarchical relationships can be user defined or defined by the data structure.

20. The method of claim 9, wherein the user interface is operable to suggest a set of one or more additional concepts that are related to one or more of the concepts displayed by the user interface.

21. The method of claim 20, further comprising enabling the one or more users to modify the visual properties to interact with the semantic network, wherein the user interface is operable to suggest a second set of one or more additional concepts that are related to the concepts displayed by the modified user interface.

22. The method of claim 20, wherein the one or more users can select any portion of the displayed concepts that are used to suggest the one or more additional concepts.

23. The method of claim 22, wherein the selected portion of the displayed concepts may be indirectly related.

24. A system for executing a computer-implemented method for displaying a data structure including data entities and relationships between the data entities, wherein one or more user context properties are associable with the data entities, and enabling one or more users to interact with the data structure including by creating the data structure, the system comprising one or more computer devices including or being linked to:
(a) at least one display, and
(b) a user interface utility operable to:
  (i) present to one or more users a user interface, by means of the at least one display; and
  (ii) populate the user interface with data entities from the data structure by enabling the one or more users to associate one or more visual properties of the user interface with the user context associable properties of the data structure, thereby enabling the one or more users to interact with the data structure by means of the user interface;
wherein the relationships are hierarchical or polyhierarchical;
wherein in the user interface, one larger data entity having a higher number of visual properties determines a higher level of hierarchy and thereby dissolves the poly-hierarchical relationship.

25. The system of claim 24, wherein the data entities are represented by interface components including contextual or graphical labels.

26. The system of claim 25, wherein the visual properties include size, wherein the nearest larger sized data entity to another particular data entity represents a hierarchical relationship between the data entities.

27. The system of claim 26, wherein hierarchical relationships between data entities can be manipulated by changing a size of at least one of the data entities.

28. The system of claim 26, wherein a hierarchical relationship between data entities can be manipulated by changing a distance between at least two data entities.

29. The system of claim 24, wherein the user interface utility is operable to create a network of data entities on the user interface, and initiate the network to be stored to a storage means linked to the one or more computer devices.

30. The system of claim 29, wherein the data entities stored to the memory can be retrieved as a related network.

31. The system of claim 26, wherein the system is operable to map the hierarchical relationship between the data entities to a database of semantically synthesized concept relations.

32. The system of claim 31, wherein the visual properties of the user interface are associated with the data entities, and wherein, by operation of the user interface utility, the plurality of visual properties appear in a drop down menu originating from the database of semantically synthesized concept relations, such that modifying one or more visual properties modifies the data structure.

33. The system of claim 31, wherein the user interface is operable to present to the user a drop down menu of the visual properties, such that the visual properties can change if the hierarchical relationship between the data entities changes.

34. The system of claim 31, wherein the system enables the one or more users to add visual properties for a data entity to be recorded for the database.

35. The system of claim 24 that is operable to enable the one or more users, after clicking an icon presented by the user interface, to add and edit notes and graphics for a data entity.

36. The system of claim 26, wherein a polyhierarchical relationship is represented on the user interface by a data entity that has at least two equidistant and equally larger data entities.

37. A system for executing a computer-implemented method for displaying a data structure including data entities and relationships between the data entities, wherein one or more user context properties are associable with the data entities, and enabling one or more users to interact with the data structure including by creating the data structure, the system comprising one or more computer devices including or being linked to:
(a) at least one display, and
(b) a user interface utility operable to:
  (i) present to one or more users a user interface, by means of the at least one display; and
  (ii) populate the user interface with data entities from the data structure by enabling the one or more users to associate one or more visual properties of the user interface with the user context associable properties of the data structure, thereby enabling the one or more users to interact with the data structure by means of the user interface;
wherein the data entities are represented by interface components including contextual or graphical labels;
wherein the relationships are hierarchical or polyhierarchical and the visual properties include size, wherein the nearest larger sized data entity to another particular data entity represents a hierarchical relationship between the data entities;

wherein a polyhierarchical relationship is represented on the user interface by a data entity that has at least two equidistant and equally larger data entities;
wherein one larger data entity having a higher number of visual properties determines a higher level of hierarchy and thereby by operation of the user interface utility dissolves the poly-hierarchical relationship.

38. A system for executing a computer-implemented method for displaying a data structure including data entities and relationships between the data entities, wherein one or more user context properties are associable with the data entities, and enabling one or more users to interact with the data structure including by creating the data structure, the system comprising one or more computer devices including or being linked to:
   (a) at least one display, and
   (b) a user interface utility operable to:
      (i) present to one or more users a user interface, by means of the at least one display; and
      (ii) populate the user interface with data entities from the data structure by enabling the one or more users to associate one or more visual properties of the user interface with the user context associable properties of the data structure, thereby enabling the one or more users to interact with the data structure by means of the user interface;
   wherein the data entities are represented by interface components including contextual or graphical labels;
   wherein the relationships are hierarchical or polyhierarchical and the visual properties include size, wherein the nearest larger sized data entity to another particular data entity represents a hierarchical relationship between the data entities;
   wherein a polyhierarchical relationship is represented on the user interface by a data entity that has at least two equidistant and equally larger data entities;
   wherein one larger data entity having a higher confidence value determines a higher level of hierarchy and thereby by operation of the user interface utility dissolves the poly-hierarchical relationship.

39. A system for executing a computer-implemented method for displaying a data structure including data entities and relationships between the data entities, wherein one or more user context properties are associable with the data entities, and enabling one or more users to interact with the data structure including by creating the data structure, the system comprising one or more computer devices including or being linked to:
   (a) at least one display, and
   (b) a user interface utility operable to:
      (i) present to one or more users a user interface, by means of the at least one display; and
      (ii) populate the user interface with data entities from the data structure by enabling the one or more users to associate one or more visual properties of the user interface with the user context associable properties of the data structure, thereby enabling the one or more users to interact with the data structure by means of the user interface;
   wherein the data entities are represented by interface components including contextual or graphical labels;
   wherein the relationships are hierarchical or polyhierarchical and the visual properties include size, wherein the nearest larger sized data entity to another particular data entity represents a hierarchical relationship between the data entities;
   wherein a polyhierarchical relationship is represented on the user interface by a data entity that has at least two equidistant and equally larger data entities;
   wherein the user interface utility enables the one or more users to dissolve the poly-hierarchical relationship by selecting one of the larger data entities to determine a higher level of hierarchy.

40. The system of claim 24, wherein the user interface utility enables the user to scroll the user interface vertically or horizontally to automatically accommodate an expanding network of data entities.

41. The system of claim 24, wherein the user interface utility enables the one or more users to zoom in and zoom out of a portion of the data entities.

42. The system of claim 26, wherein the hierarchical relationships can be user defined or defined by the data structure.

43. A non-transitory computer program product containing executable computer program instructions which when executed by one or more computers having a display, presents a user interface corresponding to a data structure and enables one or more users to interact with the data structure including by creating the data structure, the data structure including data entities and relationships between the data entities, wherein one or more user context properties are associable with the data entities, the interaction with the data structure on a user interface including: populating the user interface with data entities from the data structure by enabling the one or more users to associate one or more visual properties of the user interface with the user context associable properties of the data structure, thereby enabling the one or more users to interact with the data structure by means of the user interface, using one or more computer processors; wherein the relationships are hierarchical or polyhierarchical; wherein in the user interface, one larger data entity having a higher number of visual properties determines a higher level of hierarchy and thereby dissolves the poly-hierarchical relationship.

44. The non-transitory computer program product of claim 43, wherein a hierarchical relationship between data entities can be manipulated, using the user interface, by changing a size of a data entity.

45. The non-transitory computer program product of claim 43, wherein a hierarchical relationship between data entities can be manipulated, using the user interface, by changing a distance between two data entities.

46. The non-transitory computer program product of claim 43, enabling the one or more users, using the user interface, to create a network of data entities on the user interface, and initiate the network to be stored to a storage means linked to the one or more computer devices.

47. The non-transitory computer program product of claim 43, enabling the one or more users, using the user interface, to initiate the mapping of the hierarchical relationship between the data entities to a database of semantically synthesized concept relations.

48. The non-transitory computer program product of claim 43, wherein in the user interface, at least two larger data entities of a same size equidistant to a smaller data entity represent a poly-hierarchical relationship between the data entities.

49. A non-transitory computer program product containing executable computer program instructions which when executed by one or more computers having a display, presents a user interface corresponding to a data structure and enables one or more users to interact with the data structure including by creating the data structure, the data structure including data entities and relationships between the data entities, wherein one or more user context properties are associable with the data entities, the interaction with the data structure on a user interface including: populating the user interface with data entities from the data structure by enabling the one or more users to associate one or more visual properties of the user interface with the user context associable properties of the data structure, thereby enabling the one or more users to interact with the data structure by means of the user interface, using one or more computer processors wherein the relationships are hierarchical or polyhierarchical; wherein in the user interface, one larger data entity having a higher confidence value determines a higher level of hierarchy and dissolves the poly-hierarchical relationship.

50. A non-transitory computer program product containing executable computer program instructions which when executed by one or more computers having a display, presents a user interface corresponding to a data structure and enables one or more users to interact with the data structure including by creating the data structure, the data structure including data entities and relationships between the data entities, wherein one or more user context properties are associable with the data entities, the interaction with the data structure on a user interface including: populating the user interface with data entities from the data structure by enabling the one or more users to associate one or more visual properties of the user interface with the user context associable properties of the data structure, thereby enabling the one or more users to interact with the data structure by means of the user interface, using one or more computer processors; wherein the relationships are hierarchical or polyhierarchical; wherein in the user interface, the one or more users dissolve the poly-hierarchical relationship by selecting one of the larger data entities to determine a higher level of hierarchy.

51. The non-transitory computer program product of claim 43, wherein each data entity has a size, and wherein the nearest larger sized data entity to another particular data entity represents a hierarchical relationship between the data entities.

* * * * *